2 Sheets—Sheet 2.
G. BUCHANAN.
WAGON LOCK.
No. 29,764. Patented Aug. 28, 1860.
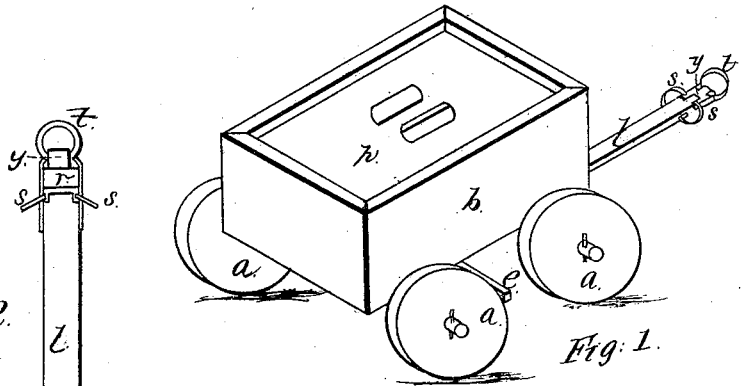
Fig. 1.
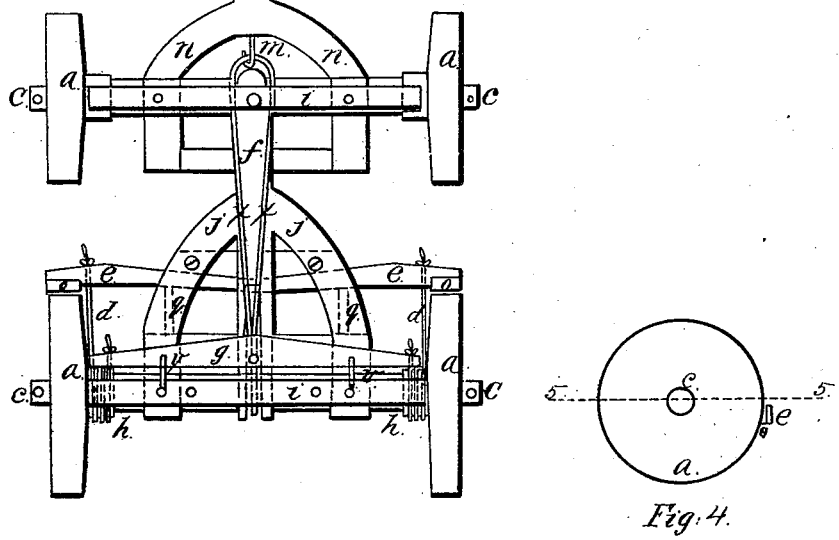
Fig. 2.
Fig. 4.
Witnesses:
James J. Johnston
George P. Steck
Inventor:
George Buchanan

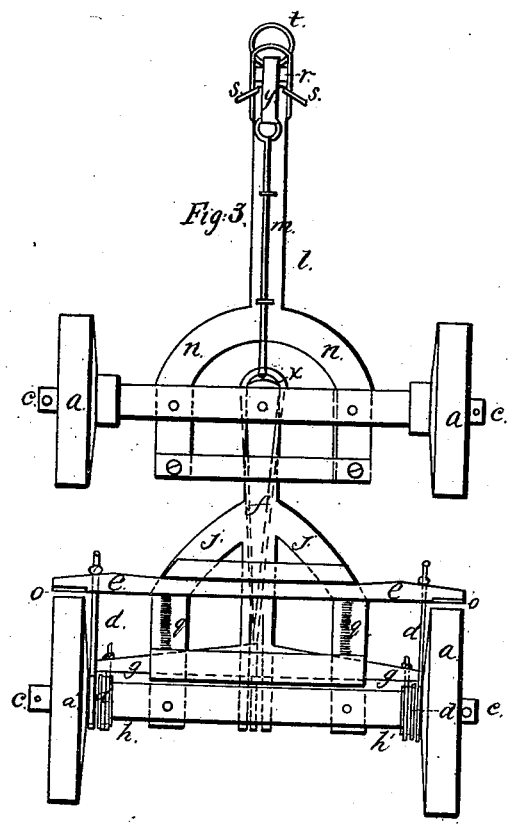

UNITED STATES PATENT OFFICE.

GEORGE BUCHANAN, OF HICKORY, PENNSYLVANIA.

SELF-ACTING WAGON-BRAKE.

Specification of Letters Patent No. 29,764, dated August 28, 1860.

*To all whom it may concern:*

Be it known that I, GEORGE BUCHANAN, of Hickory, Washington county, in the State of Pennsylvania, have invented certain new and useful Improvements in Wagon-Locks; and I do hereby declare that the following is a full and exact description thereof, reference being had to the accompanying drawings and to the letters of reference marked thereon.

The nature of my invention consists in an arrangement of brake, bar, cords or chains, springs, pulleys, and operating rods, when used in connection with cars, wagons and carriages, the whole being arranged, combined, constructed and operated in the manner hereinafter described.

To enable others skilled in the art to make and use my invention I will proceed to describe its construction and operation.

In the accompanying drawings, Figure 1, is a perspective view of the wagon. Fig. 2, is a top view of the wagon, with the bed removed from off the running gear. Fig. 3, represents an underside view of the wagon, with the bed removed. Fig. 4, is a face view of a wheel and represents the position of the brake.

(*a*), are the wheels; (*c*), are the axletrees; (*j*), are the back-hounds; (*f*) is the coupling pole; (*n*) are the front-hounds; (*l*), is the wagon tongue; (*i*), are the bolsters on which the bed of the wagon rests; (*s*), are rings for the breast-chains; (*b*), is the wagon bed; (*p*), is a block placed in the wagon bed to represent a weight or load.

The inner end of the hubs of the hind wheels are constructed so as to form a pulley furnished with a flange marked (*h*), around the hubs of the hind wheels are placed cords or chains (*d*), one end of which is secured to the bar (*g*), and the other end is secured to the brake (*e*).

(*o*) are the rubbers which are secured to the brake (*e*).

(*x*) is an operating rod which is attached to the bar (*g*).

(*m*) is an operating rod which is attached to rod (*x*) and is held to its place on the under-side of the tongue by means of two staples. Attached to the end of rod (*m*) is a strap (*y*) to which is secured a ring (*r*).

(*q*) are springs which are used for the purpose of holding the brakes off from the wheels.

(*v*) are springs which are used for the purpose of drawing back the bar (*g*), so as to slacken the cords or chains (*d*) on the hubs of the hind wheels.

The brake (*e*) is arranged so as to bear against the periphery of the hind wheels on a line below their center, represented by line 5 in Fig. 4. The strap (*y*) moves on the pulley (*r*) which is placed at the end of the wagon tongue (*l*).

The operation of my invention is as follows: The ring (*t*) is connected with the breeching of the harness on the horses by means of straps or other suitable device. To brake or lock the hind wheels, the horses are made to hold back, which will cause the strap (*y*) to draw the rods (*m* and *x*) and the bar (*g*) forward, which will bring the brake (*e*) to bear against the hind wheels, and tighten the cords or chains (*d*) on the hubs. When the horses cease to hold back, the springs (*q*) will force the brake (*e*) forward and off from the wheels, and the springs (*c*) will draw the bar (*g*) back, and thereby slacken the cords or chains on the hubs. It will be observed that when it is necessary to back the wagon the brake will not bear against the wheels, the back motion of the wheels will slacken the cords or chains. And it will also be observed that the forward motion of the hind wheels has a great tendency to tighten the cords or chains on the hubs, which will greatly assist in bringing the brake (*e*) to bear against the wheels.

Having thus described the nature construction and operation of my improvement, what I claim as of my invention, and desire to secure by Letters Patent of the United States, is—

The arrangement of the brake (*e*), bar (*g*), rods (*x*, and *m*), strap (*y*), springs (*q*, and *v*), and cords or chains (*d*), when used in combination with cars, wagons and carriages, the whole being arranged, combined, constructed and operated as herein described and for the purpose set forth.

GEORGE BUCHANAN.

Witnesses:
GFORGE P. STECK,
JAMES J. JOHNSTON.